United States Patent
Kawaguchi et al.

[11] Patent Number: 6,112,806
[45] Date of Patent: *Sep. 5, 2000

[54] HEAT EXCHANGER USING DRAG REDUCING FLUID

[75] Inventors: Yasuo Kawaguchi; Akira Yabe, both of Tsukuba, Japan

[73] Assignee: Agency of Industrial Scienceand Technology Ministry of International Trade & Industry, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/544,261

[22] Filed: Oct. 17, 1995

[30] Foreign Application Priority Data

Oct. 18, 1994 [JP] Japan ................................. 6-278321

[51] Int. Cl.⁷ ............................................. F28D 7/02
[52] U.S. Cl. ......................... 165/164; 165/166; 165/96
[58] Field of Search ................... 165/166, 181, 165/184, 151, 164, 96

[56] References Cited

U.S. PATENT DOCUMENTS

| | | | |
|---|---|---|---|
| 2,032,065 | 2/1936 | Modine | 165/151 |
| 2,068,955 | 1/1937 | Kritzer et al. | 165/151 |
| 3,741,285 | 6/1973 | Kuethe | 165/181 |
| 4,420,039 | 12/1983 | Dubrovsky | 165/166 X |
| 4,534,875 | 8/1985 | Rose | 252/71 |
| 4,690,211 | 9/1987 | Kuwahara et al. | 165/184 X |
| 4,749,032 | 6/1988 | Rosman et al. | 165/166 X |
| 4,815,531 | 3/1989 | Presz, Jr. et al. | 165/166 X |
| 4,919,200 | 4/1990 | Glomski et al. | 165/166 |
| 5,143,635 | 9/1992 | Young et al. | 252/34 |

FOREIGN PATENT DOCUMENTS

| | | |
|---|---|---|
| 60-253794 | 12/1985 | Japan . |
| 62-93584 | 6/1987 | Japan . |
| 2184530 | 6/1987 | United Kingdom ............ 165/166 |
| 2214626 | 9/1989 | United Kingdom ............ 165/166 |

OTHER PUBLICATIONS

H.W. Bewersdorff, "Drag Reduction in Surfactant Solutions." Structure of Turbulence and Drag Reduction, IUTAM Symposium Zurich/Switzerland 1989, pp. 293–312.

*Primary Examiner*—Christopher Atkinson
*Attorney, Agent, or Firm*—Oblon, Spivak, McClelland, Maier & Neustadt, P.C.

[57] ABSTRACT

A heat exchanger which uses a drag reduction fluid as one of its two heat transfer media has a heat transfer plate formed with irregularities.

20 Claims, 1 Drawing Sheet

HEAT EXCHANGER USING DRAG REDUCING FLUID

BACKGROUND OF THE INVENTION

1. Field of the Invention

This invention relates to a heat exchanger which uses a drag reducing fluid as its heat transfer medium. Heat exchangers of this type are used in district heating/cooling systems, heat transportation systems for heating and cooling, and industrial processes that employ hot water as a heat transfer medium in the production of chemical products, processed foods and the like.

2. Description of the Prior Art

The drag that arises between the surface of the heat exchanger and the heat transfer medium with which it exchanges heat is known to increase the amount of pumping power required for circulating the heat transfer media. When a heat transfer medium such as hot water is pumped through a long pipeline in a district heating system, for example, the system is required to have very large pumping power to overcome the drag between the heat transfer medium and the pipe wall. Since a reduction in drag translates into a reduction in the required pumping power, it has been proposed to use a drag reducing fluid (DR fluid) as the heat transfer medium. It is known that a DR fluid, which is water mixed with a surfactant or a water-soluble polymer, can reduce drag in a pipeline to about one fifth that of water alone. From this it follows that the pumping power cost which accounts for 30% of the operating expense of a district heating system could be reduced to about one fifth by use of a DR fluid as the heat transfer medium. (Bewesdorff, H. W., Structure of Turbulence and Drag Reduction, (1990), 293, Springer et al.)

It is widely known, however, that the drag reduction obtained by use of a DR fluid comes at the expense of a loss in the heat exchange performance of the heat exchanger. Application of DR fluid-based drag reduction technology to a district heating system therefore requires installation of a large and complicatedly configured heat exchanger. As a result, the initial investment is large and the reduction in pumping power is not as great as might be hoped.

This invention was accomplished in light of the foregoing circumstances and has as its object to provide a heat exchanger which utilizes the special properties of a DR fluid to achieve small drag while also achieving high heat exchange performance in the heat exchanger.

SUMMARY OF THE INVENTION

For realizing this object, the present invention provides a heat exchanger using a drag reducing fluid wherein the heat transfer surface of the fluid passage on the drag reducing fluid side is formed with irregularities.

The physical properties a DR fluid in a heat exchanger using a DR fluid vary in sharp response to changes in temperature. By providing the heat transfer surface of the heat exchanger with appropriately shaped irregularities for utilizing this characteristic of the DR fluid, the heat transfer of the heat exchanger can be increased while taking advantage of the drag reducing effect of the DR fluid.

As background information for making the invention easier to understand, a brief explanation will be given regarding the viscosity of a DR fluid and the friction drag that appears during laminar and turbulent flow.

Turbulent flow is characterized by the presence of numerous eddies moving randomly in the flow field and is commonly observed in high Reynolds number flow such as occurs, for example, in rivers, the wind and industrial facilities. Laminar flow appears in the low Reynolds number region and is seen, for example, in capillaries and viscometers. In laminar flow, there is no random eddy motion.

Drag reducing (DR) fluids reduce drag caused by turbulent flow, which is by far the most common kind of flow encountered in industry. Because of this, the reduction of drag in turbulent flow is usually referred to simply as "drag reduction," although the precise term is "drag reduction in turbulent flow." This abbreviated usage is adopted in this specification.

A DR fluid is usually composed of a solvent and a drag reducing additive. In turbulent flow, the DR fluid exhibits lower drag than the solvent under the same conditions. In laminar flow, it exhibits higher drag. These completely opposite effects in different flow regimes is thought to result from the presence of the drag reducing additive in the solvent in the form of "large-scale structures."

A typical DR fluid consists of water (the solvent) and a polymer or surfactant (the drag reducing additive). The apparent viscosity of such a DR fluid, as determined by viscometric measurement, is higher than that of its solvent alone. This is because in laminar flow the large-scale structures formed by the additive increase the apparent viscosity and produce greater drag than the solvent alone flowing at the same rate in a pipe of the same diameter. In other words, in the simple fluid motion appearing in the laminar state, the fluid property directly affects the drag in flow.

The relationship between viscosity and drag is very different in turbulent flow. In turbulent flow, there are numerous eddies or vortices that are effective carriers of momentum and heat and the turbulent mixing they cause produces large friction drag and increased heat transfer.

Since the friction drag caused by the random motion of eddies in turbulent flow is several tens of times greater than that occurring in laminar flow, viscosity does not significantly affect drag in high Reynolds number turbulent flow.

The widely accepted explanation for this is that the large scale structures formed by the additive in the DR fluid suppress the eddies occurring in turbulent state, thus drastically reducing turbulent drag. One theory holds that the turbulent eddy suppression is the result of enhanced fluid elasticity or elongation viscosity in the DR fluid. At any rate, it is known that these properties increase with shear viscosity measured in the laminar state. Therefore, increased shear viscosity becomes a measure of the formation of large scale structures in the DR fluid, i.e., a measure of drag reduction effect in the turbulent flow regime.

DESCRIPTION OF THE PREFERRED EMBODIMENT

Figure 1:
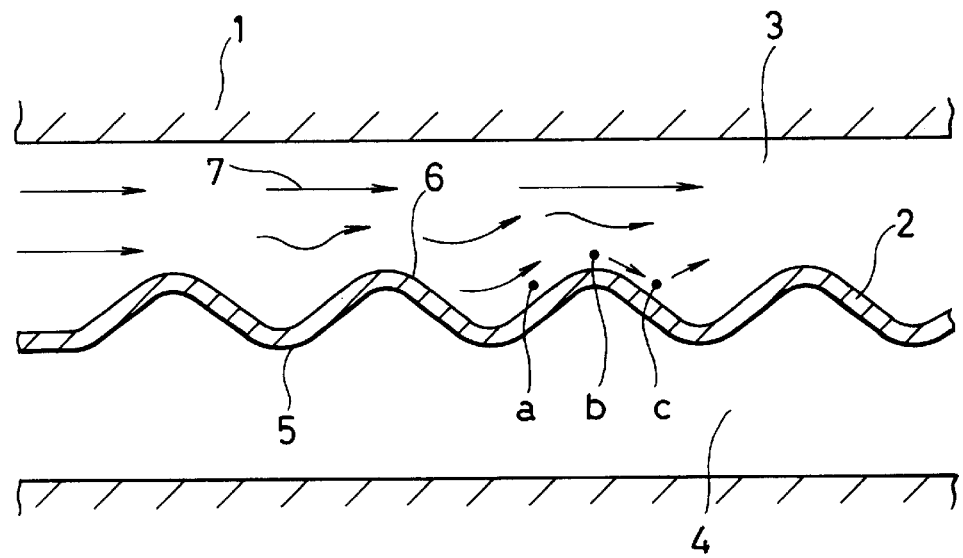
FIG. 1 is an enlarged schematic diagram of an essential portion of a heat exchanger according to the invention.

The invention will now be explained in detail with reference to an embodiment shown in the drawings.

In FIG. 1, reference numeral 1 designates a schematic representation of the heat exchange portion of a heat exchanger. The heat exchange portion 1 is partitioned into two fluid passages 3 and 4 by a heat transfer plate 2. A DR fluid 7 is used as the heat transfer medium flowing through the fluid passage 3. The DR fluid 7 is a solution of a surfactant or a water-soluble polymer in pure water. As the surfactant of the DR fluid there can be used, for example, hexadecyl trimethyl ammonium chloride ($C_{19}H_{42}NCl$, also know as cetyl trimethyl ammonium chloride) produced by Nacalai Tesque Co., Japan. This type of DR fluid is well known and commercially available. The fluid flowing through the fluid passage 4 exchanges heat with the DR fluid flowing through the fluid passage 3. It can be a liquid such as water or oil but is not limited to a liquid and can instead be a high-temperature gas or other such heat transfer medium.

The heat transfer surface 6 of the heat transfer plate 2 on the side of the fluid passage 3 is formed with irregularities. The shape of the irregularities can be wavy as shown in the drawing but can instead be fin-like or be configured in any of various other shapes.

A specific example of the irregularities of the heat transfer surface 6 would be triangular waves having a pitch of about 23 mm and a wave height of 7.5 mm.

While the shape of the heat transfer surface 5 on the side of the fluid passage 4 is wavy in the illustrated embodiment, it can be of any shape, including flat.

Figure 2:
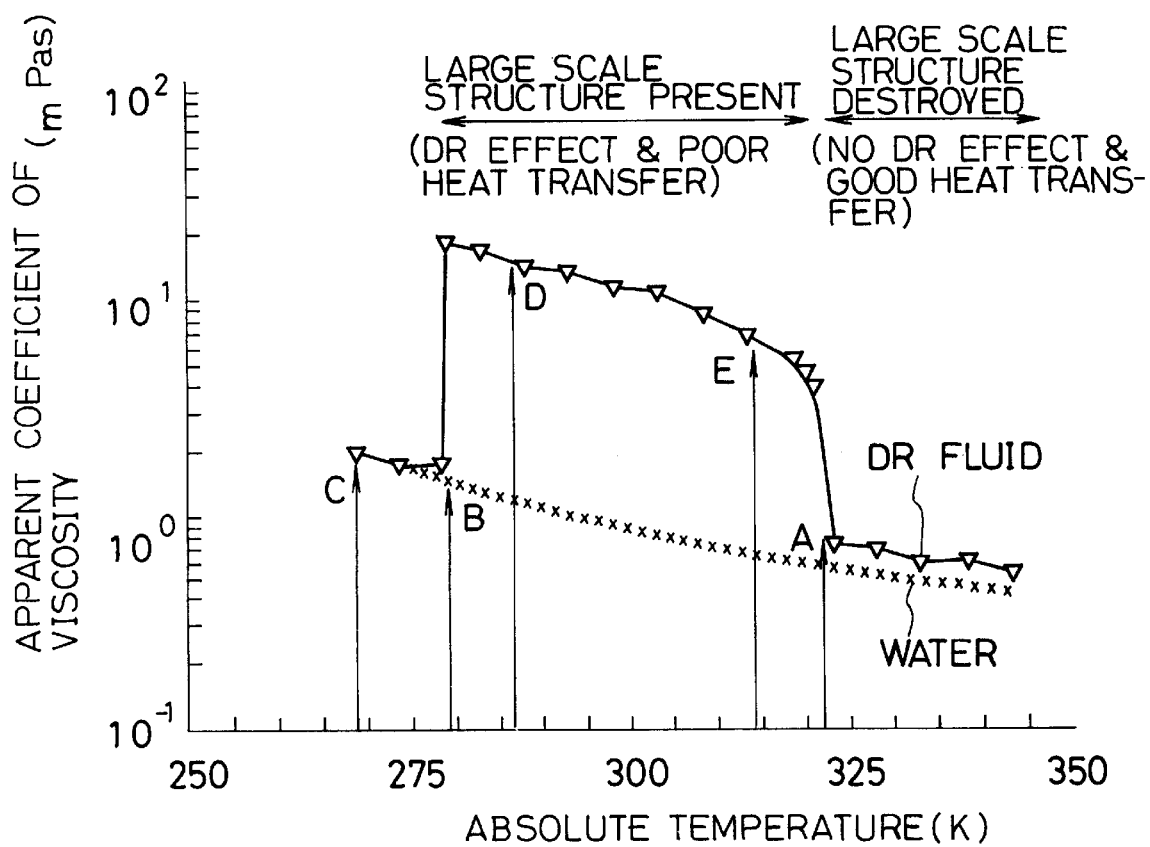
FIG. 2 is a graph showing an example of the temperature effect on the physical property of a DR fluid.

FIG. 2 shows the temperature effect of CTAC (an aqueous surfactant solution) which is suitable for use as the DR fluid in the heat exchanger according to the invention. The vertical axis of the graph of FIG. 2 is scaled for the shear viscosity of the liquid and the horizontal axis for the absolute temperature of the solution. It is widely known that shear viscosity is a measure of the formation large structures in a DR fluid. The drag reduction effect in turbulent flow can therefore be expected to increase with increasing viscosity. In the vicinity of 270 K, the viscosity of the DR fluid is low and coincides with that of water (point "C"). At around 280 K, however, the viscosity rises sharply. This indicates the formation of large scale structures in the solution and suggest that, in turbulent flow in the heat exchanger, the DR fluid exhibits its DR effect, while its heat transfer coefficient falls simultaneously (point "B"). As the temperature rises further, the viscosity of the DR fluid has a large value and the heat transfer coefficient is thought to be low up to around 315 K (point "D") in turbulent flow. When the temperature exceeds 320 K, the coefficient of viscosity falls rapidly. This change corresponds to the destruction of the large scale structures in the solution due to high temperature. The physical property of the DR fluid therefore becomes the same as water and the turbulent flow and heat transfer coefficient reduction effect is thought to be lost simultaneously (point "A").

The operation of the invention heat exchanger when the DR fluid with the aforesaid temperature effect flows through the heat transportation system will now be explained. The system is designed to maintain the DR fluid flowing out and back through pipelines of the heat transportation system at a temperature lower than that at point "A" in FIG. 2 (e.g., at a temperature between points "D" and "E"). This maintains the presence of the large scale structures in the DR fluid and reduces the turbulent drag of the DR fluid in the pipelines, thus lowering the main portion of the fluid drag of the heat transportation system. By lowering the heat transfer coefficient, it also minimizes the amount of heat escaping from the pipelines.

The turbulent DR fluid flows into the heat exchanger. At this time, the heat transfer surface 6 of the heat transfer plate 2 is heated to a temperature higher than point "A" by the fluid in the fluid passage 4. As a result, only the DR fluid in the vicinity of the heat transfer surface 6 loses its DR effect, causing an increase in drag and raising the heat transfer coefficient of the fluid near the heat transfer surface. Since the heat transfer plate 2 is formed with irregularities, the velocity of the DR fluid is accelerated near protruding portions of the heat transfer surface 6, such as at point a in FIG. 1, as indicated by the arrows. Since the thermal boundary layer becomes thinner in these regions, good transfer of heat is obtained. Moreover, loss of the large scale structures in the solvent causes active motion. This turbulent eddy motion acts to diminish the pressure gradient near the separation point. Therefore, the flow separation point shifts downstream, and the distance between b and c increases to produce a further rise in the amount of heat exchange.

As is clear from the foregoing, the heat transfer efficiency of the heat exchanger can be enhanced by providing the heat transfer surface 6 with irregularities of an appropriate shape.

The fluid flowing through the fluid passage 4 is for heating the heat transfer surface 6 of the heat transfer plate 2 to a temperature higher than the temperature of point "A" in FIG. 2 and can be water, oil or gas heated to a prescribed temperature. It is also possible to embed an electric heater or the like in the heat transfer plate 2 and use it to directly heat the heat transfer surface 6 to a temperature higher than point "A."

Fluid heated to a high temperature is present only in a limited region near the heat transfer plate and is therefore small in quantity. When it mixes with the rest of the fluid on exiting from the heat exchanger, therefore, the temperature of the fluid as a whole averages to a point below point "A" (e.g., point "E"), whereby the DR effect is reestablished and the drag in the pipeline decreases.

If there is a possibility of heat exchange proceeding more than expected in the heat exchanger so that the temperature of DR fluid rises markedly to the point that no DR effect is obtained in the pipelines, it suffices to use a DR fluid that maintains its DR effect even at high temperatures.

Since the heat exchanger according to this invention utilizes the special properties of a DR fluid and has its heat transfer surface provided with irregularities of a special configuration, the drag of the DR fluid increases at the time of receiving heat from the heat transfer surface to thereby expand the range of its contact with the heat transfer surface, the heat transfer coefficient increases and raises the heat exchange rate, and the DR effect of the DR fluid is restored after separation from the heat transfer surface, whereby the overall heat transportation system achieves both low fluid drag and high heat transfer performance in the heat exchanger.

What is claimed is:

1. A heat exchanger comprising:
   a passage including a portion having a heat transfer device with a first heat transfer surface located within an interior of the passage, the first heat transfer surface having irregularities, the passage defining a flow path for a drag reducing fluid; and
   a heating device configured to heat the first heat transfer surface to a temperature such that a first portion of the drag reducing fluid adjacent the first heat transfer surface is at a temperature at which the first portion of the drag reducing fluid fails to exhibit drag reducing properties, and such that a second portion of the drag reducing fluid in a remainder of the passage is at a temperature at which the second portion of the drag reducing fluid exhibits drag reducing properties.

2. The heat exchanger according to claim 1, wherein the heat transfer device is a corrugated plate.

3. The heat exchanger according to claim 1, wherein the first heat transfer surface is corrugated.

4. The heat exchanger according to claim 1, wherein the heating device is an electrical heater.

5. The heat exchanger according to claim 4, wherein the heating device is embedded in the heat transfer device.

6. The heat exchanger according to claim 1, wherein:
the heat transfer device includes a second heat transfer surface; and
the heating device is a secondary passage defining a flow path for a heat transfer fluid, the second heat transfer surface being located within an interior of the secondary passage.

7. The heat exchanger according to claim 6, wherein the second heat transfer surface has irregularities.

8. The heat exchanger according to claim 6, wherein the second heat transfer surface is corrugated.

9. The heat exchanger according to claim 6, wherein the heat transfer fluid is water, oil or gas.

10. A heat exchanger comprising:
a passage defining a flow path for a drag reduction fluid;
a heat transfer device having a first surface defining a portion of the flow path, the first surface having irregularities thereon; and
a heating device configured to heat the first surface to a temperature at which a boundary layer of drag reducing fluid adjacent the first surface of the heat transfer device fails to exhibit drag reducing properties, while drag reducing fluid in a remainder of the passage exhibits drag reducing properties.

11. The heat exchanger according to claim 10, wherein the heat transfer device is a corrugated plate.

12. The heat exchanger according to claim 10, wherein the first surface is corrugated.

13. The heat exchanger according to claim 10, wherein the heating device is an electrical heater.

14. The heat exchanger according to claim 13, wherein the heating device is embedded in the heat transfer device.

15. The heat exchanger according to claim 10, wherein
the heat transfer device includes a second surface; and
the heating device is a secondary passage defining a flow path for a heat transfer fluid, the second surface being located within an interior of the secondary passage.

16. The heat exchanger according to claim 15, wherein the second surface has irregularities.

17. The heat exchanger according to claim 15, wherein the second surface is corrugated.

18. The heat exchanger according to claim 15, wherein the heat transfer fluid is water, oil or gas.

19. A method of enhancing heat transfer efficiency of a heat exchanger, the heat exchanger including a passage having a portion with a heat transfer device with a first heat transfer surface located within an interior of the passage, the first heat transfer surface having irregularities, the passage defining a flow path for a drag reducing fluid, said method comprising the step of:
heating the first heat transfer surface to a temperature such that a first portion of the drag reducing fluid adjacent the first heat transfer surface is at a temperature at which the first portion of the drag reducing fluid fails to exhibit drag reducing properties, and such that a second portion of the drag reducing fluid in the remainder of the passage is at a temperature at which the second portion of the drag reducing fluid exhibits drag reducing properties.

20. The method according to claim 19, wherein the step of heating the first heat transfer surface to a temperature includes passing a heat transfer fluid through a secondary passage, where the heat transfer device includes a second heat transfer surface located within an interior of the secondary passage.

* * * * *

UNITED STATES PATENT AND TRADEMARK OFFICE
CERTIFICATE OF CORRECTION

PATENT NO. : 6,112,806
DATED : September 5, 2000
INVENTOR(S) : Yasuo Kawaguchi, et al.

It is certified that error appears in the above-identified patent and that said Letters Patent is hereby corrected as shown below:

On the Title page, Item [73], the Assignee Information is incorrect. Item [73] should read as follows:

--[73] Assignee: Agency of Industrial Science & Technology, Ministry of International Trade & Industry, Tokyo, Japan--

Signed and Sealed this

Twelfth Day of June, 2001

*Attest:*

*Attesting Officer*

NICHOLAS P. GODICI
*Acting Director of the United States Patent and Trademark Office*